April 21, 1959  V. WASSILIEFF  2,883,016
IRREVERSIBLE SELF-LOCKING DEVICE
Filed July 10, 1953
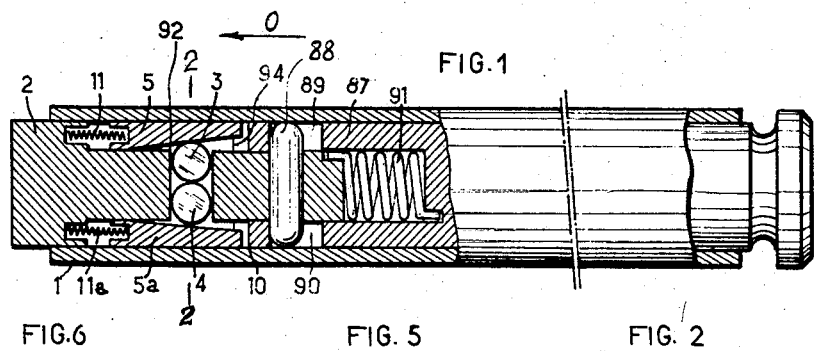
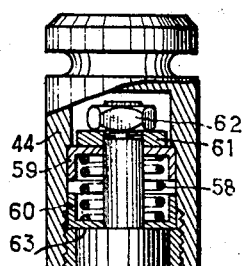
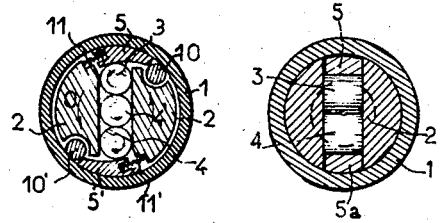
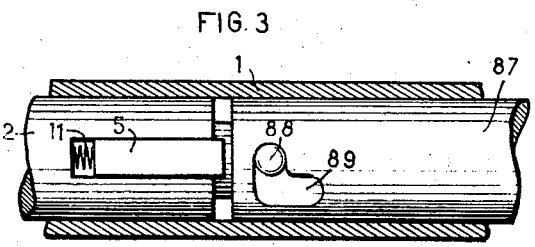
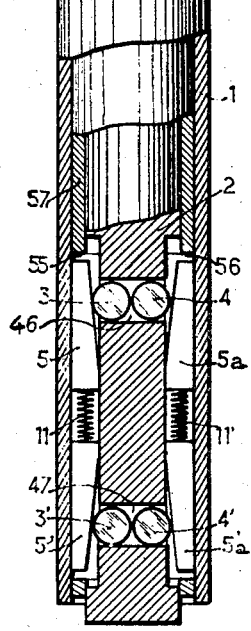
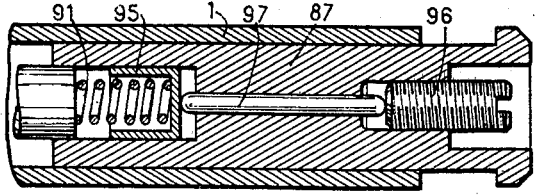
Inventor
V. Wassilieff

United States Patent Office 2,883,016
Patented Apr. 21, 1959

2,883,016

IRREVERSIBLE SELF-LOCKING DEVICE

Victor Wassilieff, Paris, France

Application July 10, 1953, Serial No. 367,129

Claims priority, application France December 18, 1952

6 Claims. (Cl. 192—8)

The present invention relates to irreversible self-locking devices of the type comprising a wedging mechanism interposed between the two elements to be locked together and including a wedging member and a rolling member in contact with said wedging member. Such a rolling member, which may be, e.g. a ball, a roller or the like, will be called hereafter a "roller."

In the known irreversible self-locking devices of this type, said wedging member is fast or even integral with one of the elements to be locked together, while the roller is freely interposed between the slope of said wedging member and a single gliding surface provided on the other element.

With this arrangement, the slope and the gliding surface exert on the roller reaction stresses giving rise to two opposite rotation torques, both tending to unwedge said roller. In these conditions, elastic means are necessarily provided to hold the roller wedged between the slope and the gliding surface, the strength of said elastic means being necessarily greater when the slope is steeper. As a result, unwedging against the action of said elastic means requires a considerable force which may be obtained only by means of demultiplying levers or the like, complicating the design of the device.

Now, if a small angle of inclination of the slope is chosen to make the use of weaker unwedging elastic means possible, the above-mentioned reaction stresses become excessive, so that, to avoid destruction of the wedging surfaces, the driving force should be limited to very small values.

Moreover, whichever may be the nature of the wedging means, there is always a slight relative sliding, that is objectionable in most applications.

Finally, locking is ensured only by the sliding friction between one generatrix of the roller (or even, a mere point in the case of a ball) and the single sliding surface.

The invention has for its purposes to overcome the drawbacks of the known devices and to provide an irreversible self-locking device which is free from any relative sliding upon wedging, ensures locking by a sliding friction between at least two surfaces, requires practically no wedging force and, hence, is capable of being easily unwedged.

An object of the invention is to provide an irreversible self-locking device of the type described, wherein the roller is loosely rotatable on and displaceable with one of the elements to be locked together, between two gliding surfaces of constant spacing provided on the other element and wherein said roller is rollingly supported, directly or through intermediate means, in respect to both said surfaces, said intermediate means including at least one wedging member freely slidable on one of said surfaces, in such a manner that, when one of said elements is displaced with respect to the other one in wedging direction, all active or reaction forces tend to roll the roller in the same direction of rotation on its both bearing surfaces. Thus the roller is not subjected when it is wedged, to any unwedging reaction stress, which suppresses any relative sliding upon wedging and permits practically omitting elastic wedging means and hence, reducing to a minimum the required unwedging force.

The wedging member is held in contact with the roller and the gliding surface by a force which may be as reduced as desired. In certain applications, said force may be merely gravity.

A more particular object of the invention is to interpose a second freely slidable wedging member between the roller and the other gliding surface, which permits locking by sliding friction between two pairs of contact surfaces.

A more particular object of the invention is to provide positive unwedging means adapted to unlock the device against the action of the above-mentioned force tending to hold the wedging member in contact with the roller.

The irreversible self-locking device according to the invention finds a wide scope of applications. It may be used in free-wheel devices, irreversible driving controls, followup controls, etc., as described hereunder.

Other objects and advantages of the present invention will become apparent from the reading of the following description, in which some embodiments are given as examples of the invention as described with reference to the accompanying drawings, in which:

Fig. 1 shows an irreversible self-locking device according to the invention interposed between telescopic members.

Fig. 2 is a cross-sectional view along line 2—2 of Fig. 1.

Fig. 3 is a view of a detail of the device shown in Fig. 1.

Fig. 4 is a sectional view of a mechanism for adjusting the strength of the spring of the device shown in Fig. 1.

Fig. 5 is a diagrammatic partial cross-sectional view of a one-way irreversible self-locking device between two rotary members and, Fig. 6 is an axial sectional view of a modification of the device of Fig. 1, in which the unwedging mechanism and the controlled element are interconnected through elastic means.

In all figures, the corresponding elements have been designated under the same references.

In Figs. 1 to 4 is shown an irreversible self-locking device according to the invention in an application to the mutual locking of two telescopic coaxial rods.

In. Fig. 1, 1 is a tube having, e.g. a circular cross-section in which two rods, 2 and 87, assembled together axially by means of a transversal keying are freely slidable; said keying constituted by a pin 88 fast with rod 2 and engaged in two L-shaped notches 89—90 provided for this purpose in rod 87 and the shape of which is clearly shown in Fig. 3, permits limited axial and angular relative displacements between rods 2 and 87. A spring 91 housed in a cylindrical bore of rod 87 tends to repel rods 2 and 87 from each other, while its ends anchored on said rods, respectively, tend to displace the same angularly with respect to one another in a predetermined direction by a torsional stress. Rollers 3 and 4 housed in a rectangular recess 92 provided for this purpose in rod 2 contact the slopes of wedging members 5 and 5a, respectively. Springs 11, 11a tend to force the wedging members 5, 5a between the rollers 3 and 4 and the gliding tracks constituted by two diametrically opposed areas of the inner cylindrical surface of tube 1.

On the other hand, rollers 3 and 4 roll on each other and are fast with rod 2. With this arrangement, the frictions exerted upon the two gliding tracks affect both surfaces of the wedging members 5 and 5a and not only, as previously, the surface of one single wedging member on one gliding track and the generatrix of a roller on the other gliding track. This avoids the necessity of providing hard gliding surfaces so that any material may be used for manufacturing the same. On the other hand, since the wedging members are adapted to fit with gliding tracks having any transversal outline, while the slopes may remain flat, rollers may be used with any shape of said gliding track transversal outline. The device shown in Figs. 1 and 3 as an illustration, provided for locking the control rod 87 on the controlled rod 2, may be required in all applications of the self-locking device according to the invention in which an unwedging of the elements due to an unexpected action on the unwedging means should be avoided. The handbrakes for motorcars may be cited as an example of such application.

The device shown in Figs. 1 to 3 operates as follows: Any axial displacement of rod 2 in the direction of arrow O would increase the pressure of the rollers on the wedging members and, hence, that of the latter on the gliding tracks. Therefore, rod 2 cannot be displaced by a direct action, if rod 1 is held stationary.

On the contrary, rod 2 can be displaced freely in the opposite axial direction with respect to tube 1 since said relative displacement tends to roll the rollers downwards the slopes of the wedging members, and, hence, in the unwedging direction. The same results may be obtained by acting, in the direction opposite to arrow O, upon rod 87, which is assembled by the transversal keying with rod 2.

When rod 87 is pushed in the direction of arrow O, rod 2 being held stationary and pin 88 being engaged in the transversal portions of notches 89 and 90, no axial displacement is possible. To actuate rod 2, it is necessary to displace first rod 87 angularly with respect to rod 2 against the torsional action of spring 91, so as to release pin 88 from the transversal portions of notches 89 and 90, while bringing said pin in registration with the longitudinal portions of said notches, which permits a relative axial displacement of rod 87 with respect to rod 2. When a thrust is then exerted upon rod 87 in the direction of arrow O, spring 91 is first compressed, the wall 10 of rod 87 is brought into contact with the smaller bases of the wedging members 5 and 5a and pushes the same against the action of springs 11 and 11a until it abuts against shoulder 94 of rod 2. Thereupon, rod 87 is capable of displacing freely rod 2 in the direction of arrow O.

As soon as rod 87 is no more acted upon, the same is brought under the action of spring 91 into its original position again, the wedging members 5 and 5a are pressed against rollers 3 and 4 by their springs 11 and 11a, respectively, and rod 2 is locked with tube 1 anew and, hence, made stationary once more.

Spring 91 may be further used for adjusting the unlocking stress to be exerted by rod 2 on rod 87. The stresses exerted on rod 87 are first transmitted to rod 2 through spring 91 and since the locking pressure of rod 2 is directly proportional to said stresses, the force required for unlocking increases with the strength of spring 91.

In Fig. 4 is diagrammatically shown means for adjusting said strength. In the example shown, spring 91 is disposed in a dish 95 slidably mounted in the above-mentioned cylindrical bore of rod 87.

A screw 96 is adapted to displace dish 95 axially through a pushing-rod 97, which permits adjusting the strength of spring 91 by screwing more or less screw 96.

It is clear that the unlocking stress is moreover directly proportional to the external force acting upon rod 2, inversely proportional to the inclination of the slopes of the wedging members and directly proportional to the strength of the springs acting upon said wedging members.

In Fig. 5 is diagrammatically shown another embodiment of the irreversible self-locking device according to the invention adapted to be interposed between two coaxial shafts. In this device, three rollers 3, 4', 4 are loosely housed in a groove having parallel faces provided for this purpose in the inner shaft 2. The inner cylindrical wall of the other shaft 1 constitutes a double gliding track for the two wedging members 5, 5' continuously held by springs 11 and 11' in contact with rollers 3 and 4, respectively; a positive unwedging device acting against said springs 11 and 11' is diagrammatically shown in the shape of two fingers 10—10'. With this arrangement, the rotation torques of those rollers which are in contact with the slopes of the wedging members have such directions that when shaft 2 is rotated around its axis of direction O, the rollers 3 and 4 respectively contacting the wedging members 5 and 5' tend to increase wedging. On the contrary, shaft 2 may be freely rotated in the direction opposite to arrow O, since said rotation tends to roll the rollers in the direction of unwedging. The unwedging device diagrammatically shown in the shape of the fingers 10 and 10', when rotating in direction O, first pushes the wedging members 5 and 5' against the action of springs 11 and 11' and then drives the released shaft 2 in the same direction. It will be easily understood that, in this case, a third intermediate roller 4' is necessarily used, or more generally an odd number of rollers, so that each roller receives from both surfaces on which it is rollingly supported, stresses both tending to rotate said roller in the same direction.

This arrangement may be used in all cases when a simple and compact self-locking device is required.

In the embodiment shown in Fig. 6, a rod 2 carries in each one of two rectangular recesses 46 and 47 a pair of rollers, 3—4, 3'—4' respectively contacting the slopes of wedging members 5—5a and 5'—5'a, respectively. The wedging members 5—5' and 5a—5'a have their larger bases facing each other and springs 11 and 11' are interposed between said bases urging the wedging members towards their respective rollers. Two recesses 55 and 56, the lengths of which are slightly greater than the distance between the outer smaller bases of the two wedging members of each pair accommodate said wedging members through an intermediary tube 57 freely slidable on rod 2 and in tube 1.

Thus, the wedging members 5—5' and 5a—5'a are wedged between rollers 3—3' and 4—4' and the gliding surfaces which, in this example, are constituted by two diagrammatically opposed areas of the inner cylindrical wall of tube 1. A spring 58 housed into dishes 59 and 60 bears through said dishes, on one side, on an annular shoulder 63 of rod 2 and, on the other side, on one face of a washer 61 held by a nut 62 on the end of said rod 2. Thus, tube 57 is held at rest centered in such a position that the edges of the longitudinal recesses 55 and 56 cannot contact the smaller bases of the wedging members. This device operates in substantially the same manner as that previously described.

What is claimed is:

1. In a drive-lock device comprising inner and outer elements one of which is movable and is frictionally held relatively to the other in at least one direction, the combination of a pair of coacting wedging members oppositely disposed between said inner and outer elements and having each two wedge surfaces one of which is adapted to slidably contact the inner wall of the outer element and the other of which forms an incline, of two mutually contacting rolling members displaceable with said inner element and arranged between said inclines of the wedging members in a line joining one of said inclines with the other, whereby upon corresponding movement of one of said elements with respect to the other said two rolling members are simultaneously rolled on said inclines to force said wedging members outward into frictional locking contact with said outer element.

2. A device according to claim 1, in which at least two pairs of coacting wedging members are arranged between said inner and outer elements in such a manner that either said inner or said outer element is frictionally locked relatively to the other in at least one direction.

3. A device according to claim 1, in which said inner and outer elements are substantially straight and said inner element is movable in a longitudinal direction.

4. A device according to claim 1, in which said inner and outer elements are circular and rotatable, a third rolling member being inserted between said two rolling members to rotate therewith in a direction opposite to that in which said two rolling members rotate when they roll on said inclines.

5. A device according to claim 1, in which positive unwedging means are provided to displace said wedging members with respect to said rolling members in unlocking direction.

6. In a control mechanism comprising an elongated tubular member and an operating member axially shiftable in said tubular member relative thereto and adapted to be connected to a device to be controlled, at least one pair of coacting wedging members oppositely disposed between said tubular member and said operating member and having each two wedge surfaces one of which is adapted to slidably contact the inner wall of the tubular member and the other of which forms an incline, at least two mutually contacting rolling members displaceable with said operating member and arranged between said inclines of the wedging members in a line joining one of said inclines with the other, and a handle member shiftable in said tubular member relative to said operating member to first displace said wedging members with respect to said rolling members in unlocking direction and then to engage said operating member to move the latter with respect to said tubular member.

References Cited in the file of this patent

UNITED STATES PATENTS

| | | |
|---|---|---|
| 843,253 | Barker | Feb. 5, 1907 |
| 1,073,403 | Dalton | Sept. 16, 1913 |
| 2,037,261 | Nenninger | Apr. 14, 1936 |
| 2,171,458 | Swartz | Aug. 29, 1939 |
| 2,330,443 | Norton | Sept. 28, 1943 |
| 2,631,470 | Sandberg | Mar. 17, 1953 |
| 2,640,242 | Weimer | June 2, 1953 |
| 2,666,339 | Schwarz | Jan. 19, 1954 |

FOREIGN PATENTS

| | | |
|---|---|---|
| 63,615 | France | Apr. 20, 1955 |
| | (Addition to No. 1,059,561) | |
| 731,443 | Germany | Feb. 6, 1943 |
| 741,628 | Great Britain | Dec. 7, 1955 |
| 1,059,561 | France | Nov. 10, 1953 |